(12) United States Patent
Fukawatase et al.

(10) Patent No.: US 7,152,881 B2
(45) Date of Patent: Dec. 26, 2006

(54) OCCUPANT PROTECTION APPARATUS FOR A VEHICLE

(75) Inventors: Osamu Fukawatase, Aichi-ken (JP);
Takeaki Kato, Aichi-ken (JP);
Hiroyoshi Yamaguchi, Yokohama (JP);
Tadanori Hisamoto, Yokohama (JP);
Shinichi Horibata, Yokohama (JP)

(73) Assignees: Toyota Jidosha Kabushiki Kaisha, Toyota (JP); NHK Spring Co., Ltd., Yokohama (JP)

( * ) Notice: Subject to any disclaimer, the term of this patent is extended or adjusted under 35 U.S.C. 154(b) by 258 days.

(21) Appl. No.: 10/781,729

(22) Filed: Feb. 20, 2004

(65) Prior Publication Data

US 2004/0169363 A1    Sep. 2, 2004

(30) Foreign Application Priority Data

Feb. 28, 2003    (JP)    ............................. 2003-053446

(51) Int. Cl.
*B60R 21/045* (2006.01)
(52) U.S. Cl. .................................................... 280/753
(58) Field of Classification Search ................ 280/751, 280/752, 753; 188/300
See application file for complete search history.

(56) References Cited

U.S. PATENT DOCUMENTS

| | | | |
|---|---|---|---|
| 4,392,671 A | 7/1983 | Föhl | |
| 4,479,599 A | 10/1984 | Conrad | |
| 4,948,168 A | 8/1990 | Adomeit et al. | |
| 4,951,963 A * | 8/1990 | Behr et al. ................. | 280/753 |
| 6,641,166 B1 * | 11/2003 | Browne et al. ............. | 280/752 |
| 6,752,423 B1 * | 6/2004 | Borde et al. ................ | 280/753 |
| 6,910,558 B1 * | 6/2005 | Wang et al. ................ | 188/300 |
| 6,916,042 B1 * | 7/2005 | Fukawatase et al. ........ | 280/751 |
| 2004/0046377 A1 * | 3/2004 | Meduvsky et al. ......... | 280/752 |

FOREIGN PATENT DOCUMENTS

| | | |
|---|---|---|
| DE | 25 37 212 A1 | 3/1977 |
| JP | A 4-197847 | 7/1992 |
| JP | B2 2679405 | 8/1997 |
| JP | A 2000-326825 | 11/2000 |
| WO | WO 01/68409 A1 | 9/2001 |

OTHER PUBLICATIONS

DERWENT-Acc-No. 1977-B9346Y—Translation of DE 2537212 (Abstract), Mar. 1977.*

* cited by examiner

*Primary Examiner*—David R. Dunn
(74) *Attorney, Agent, or Firm*—Oliff & Berridge, PLC (57) ABSTRACT

An actuator of an active knee bolster is provided with a drive force generation device and a one way lock mechanism that is disposed in a vicinity of an operation end of the drive force generation device. The one way lock mechanism is configured such that, if attempted movement of a piston member in an inward insertion direction occurs, respective engagement portions are moved to a taper portion by urging force of a spring, whereby the engagement portions are abutted against an external periphery surface of the piston member such that the piston member and the engagement portions are fixed. Accordingly, as a result of the one way lock mechanism, a main body of the active knee bolster that has been moved to a restraining position cannot return in a vehicle forward direction, and thus it is possible to generate a substantial lower limb restraining force that restrains a lower limb of an occupant.

6 Claims, 6 Drawing Sheets

OCCUPANT PROTECTION APPARATUS FOR A VEHICLE

INCORPORATION BY REFERENCE

The disclosure of Japanese Patent Application No. 2003-053446 filed on Feb. 28, 2003 including the specification, drawings and abstract is incorporated herein by reference in its entirety.

BACKGROUND OF THE INVENTION

1. Field of the Invention

The invention relates to an occupant protection apparatus for a vehicle, and more particularly, relates to an occupant protection apparatus which is mounted in a vehicle such as an automobile and which restrains the lower limbs of an occupant in the case of a collision.

2. Description of the Related Art

Examples of an occupant protection apparatus for a vehicle that is mounted in a vehicle like an automobile are known, such as the configuration disclosed in Japanese Patent No. 2679405. In this configuration, a first protector (also referred to as an "active knee bolster") and a second protector (also referred to as an "active knee bolster") are movably supported by a vehicle body. In the case that deceleration of the vehicle exceeds a predetermined value, the first and second protectors are operated by a first and second actuator so as to support lower limbs of the occupant from a vehicle forward direction. At the same time, a front portion of a seat cushion separates from a rear portion thereof, such that the front portion moves in the vehicle forward direction.

However, with art of this type, when a frontal collision of the vehicle occurs, following contact of the active knee bolsters and the lower limbs, a portion of the active knee bolsters that restrains the lower limbs (a knee area) of the occupant is moved in the direction of the lower limbs of the occupant with a substantial movement force capable of restraining the lower limbs. As a result, in particular, in the case that the active knee bolsters come into contact with the lower limbs of an occupant of large build, it is necessary from the point of view of protecting the lower limbs of the occupant at the time of contact to reduce the aforementioned movement force. However, if the movement force is reduced, the restraining force is also reduced, and the likelihood that the lower limbs will be restrained is decreased.

SUMMARY OF THE INVENTION

An object of the invention is to provide an occupant protection apparatus for a vehicle that can simultaneously protect the lower limbs of an occupant, and provide effective lower limb restraining performance, regardless of the body build of the occupant.

According to a first aspect of the invention, an occupant protection apparatus for a vehicle is provided with a deceleration detection device that detects a vehicle deceleration; a lower limb restraining device that restrains a lower limb of an occupant; and a driving device that, when an output signal of the deceleration detection device is received, actuates the lower limb restraining device. In this occupant protection apparatus, a force at which the lower limb restraining device is moved in an occupant lower limb direction is smaller than a force at which the lower limb of the occupant is restrained.

Accordingly, when the driving device receives the output signal from the deceleration detection device and actuates the lower limb restraining device, the lower limb restraining device is moved so as to restrain the lower limb of the occupant. At this time, a movement force in the occupant lower limb direction is set to be small, as compared to the force at which the lower limb restraining device restrains the lower limb of the occupant. Accordingly, it is possible to simultaneously realize protection of the lower limbs of the occupant and effective lower limb restraining performance, regardless of the body build of the occupant.

The above first aspect may also be configured such that the lower limb restraining device has a main body portion that is driven in order to restrain the lower limb, and a stopping mechanism that holds the main body portion at a position at which lower limb can be restrained. If this configuration is adopted, it is possible to reliably hold the lower limb restraining device in a lower limb restraining position, whereby lower limb restraining performance is further improved.

According to a second aspect of the invention, an occupant protection apparatus for a vehicle is provided with a deceleration detection device that detects a vehicle deceleration; a lower limb restraining member that restrains at least one of left and right lower limbs of an occupant by being moved in an occupant lower limb direction; a driving device that drives the lower limb restraining member in the occupant lower limb direction; a control device that controls activation of the driving device when a signal of the deceleration detection device is received; and a stopping mechanism that holds the lower limb restraining member such that movement in a reverse direction that is opposite to a movement direction of the lower limb restraining member is limited so that the at least one lower limb is restrained. In this occupant protection apparatus, a force at which the lower limb restraining member is moved in the occupant lower limb direction by the driving device is smaller than a force at which the stopping mechanism restrains the at least one lower limb of the occupant.

Moreover, the second aspect may be configured such that the main body portion has left and right main body sections that respectively hold the left and right lower limbs of the occupant.

The above aspect may also be configured such that the stopping mechanism is a one way lock mechanism that limits movement of the lower limb restraining member in the reverse direction that is opposite to the movement direction of the lower limb restraining member, this movement direction being generated by the driving device.

Further, the above aspect may also be configured such that the one way lock mechanism has a ball one way lock mechanism that is configured such that return of the lower limb restraining device to an original position from which the lower limb restraining device has moved is inhibited by movement into a space that remains following the movement of the lower limb restraining device, of at least one ball in accordance with the size of the space.

The above aspect may also be configured such that the lower limb restraining member includes a main body portion that can be abutted with the at least one lower limb, and a piston member that is provided for pushing the main body portion outwards in the occupant lower limb direction. Further, the one way lock mechanism may be disposed within a casing that is provided in an end portion at a vehicle backward direction side of the driving device, and the driving device may include a slip-out inhibiting member which closes off the vehicle backward direction side of the casing, and which inhibits slip-out of piston member.

The above aspect may also be configured such that the slip-out inhibiting member is provided at the end of the casing which faces towards the rear of the vehicle, and has a load regulation member, the load regulating member being configured such that, when a driving force of the driving device is generated and a load, that is equal to or greater than a predetermined load is applied to the slip-out inhibiting member, the piston member is released such that movement of the lower limb restraining device is permitted.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, a first embodiment of an occupant protection apparatus for a vehicle according to the invention will be described with reference to FIGS. 1 to 4.

It should be noted that, in the figures, the arrow FR indicates a vehicle forward direction, and the arrow UP a vehicle upward direction.

Figure 4:
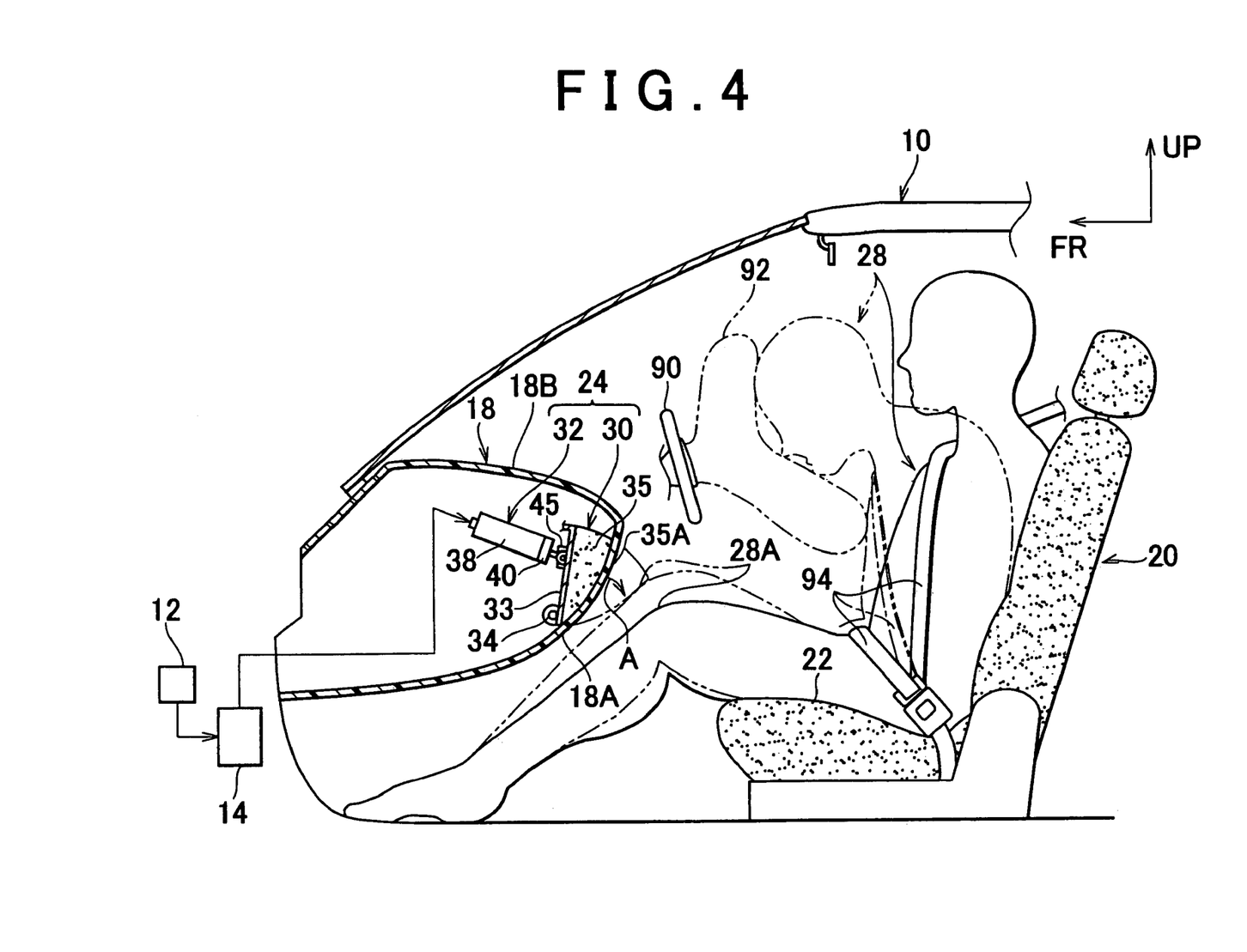
FIG. 4 is a side cross sectional view showing the occupant protection apparatus for a vehicle according to the first embodiment of the invention.

As shown in FIG. 4, the occupant protection apparatus for a vehicle of this embodiment is provided with acceleration sensors 12 that act as a deceleration detection unit that detects a collision of a vehicle 10 by detecting deceleration of the vehicle 10. Moreover, the acceleration sensors 12 are disposed in respective left and right front side members, and are connected to a control circuit 14 provided with a micro-computer that acts as a control unit.

An active knee bolster 24 is disposed in an instrument panel 18 of the vehicle 10, at a portion of the instrument panel 18 that is diagonally forward and upward from a seat cushion 22 of a front seat (a driver's seat) 20. The active knee bolster 24 is configured from a main body 30 that restrains lower limbs 28A (in particular, a knee area) of an occupant 28 who is seated in the seat 20 from a vehicle forward-upper diagonal side; and an actuator 32 that moves the main body 30 toward the lower limbs 28A of the occupant 28.

Figure 3:
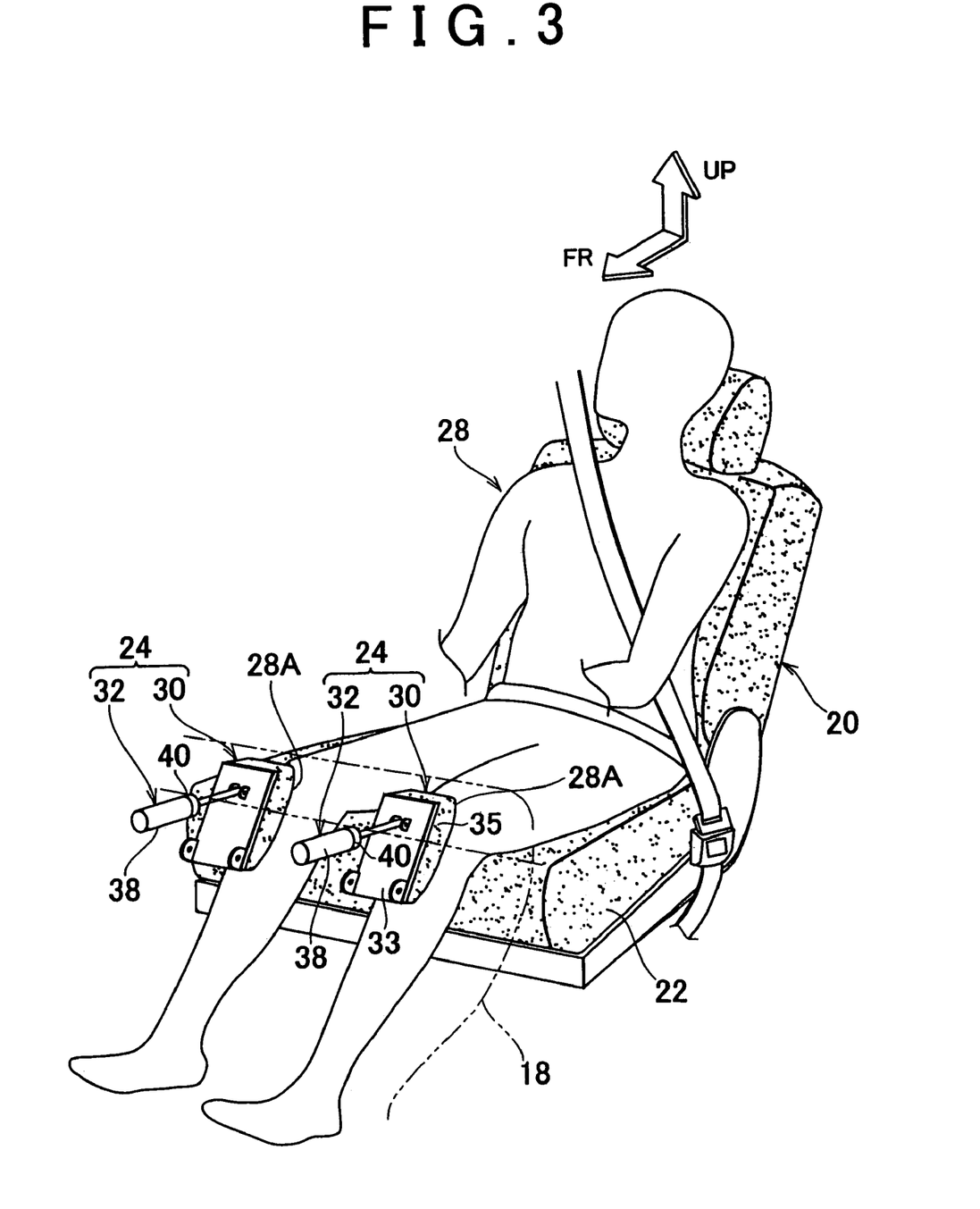
FIG. 3 is a perspective view of the occupant protection apparatus for a vehicle according to the first embodiment of the invention as seen from a vehicle front-diagonal direction.

As shown in FIG. 3, the main body 30 of the active knee bolster 24 is configured from a pair of active knee bolsters 24 that respectively support the left and right lower limbs 28A of the occupant 28. Hereinafter, the explanation will focus on one of these active knee bolsters 24, although the same explanation applies to both. An EA member 35 which act as shock absorbing member and which is made from urethane, or the like, is disposed on an occupant side surface of a base portion 33 of the main portion 30 of the active knee bolster 28.

As shown in FIG. 4, a surface layer 35A made from resin, or the like, is disposed on an occupant side surface of the EA member 35 of the main body 30 of the active knee bolster 24. The surface layer 35A forms one part of a general surface 18A of the instrument panel 18.

When the actuator 32 of the active knee bolster 24 operates, the main body 30 is rotationally moved around a connecting shaft 34 which connects with a vehicle body side and which is disposed along a vehicle width direction at a lower portion of the base portion 33. At this time, the main body 30 is rotationally moved around a connecting shaft 34 in the direction of the lower limbs 28A of the occupant 28 (the direction indicated by arrow A in FIG. 4) from a stored position indicated by the solid line shown in FIG. 4 to a lower limb restraining position indicated by the two-dot chain line in FIG. 4.

Figure 1:
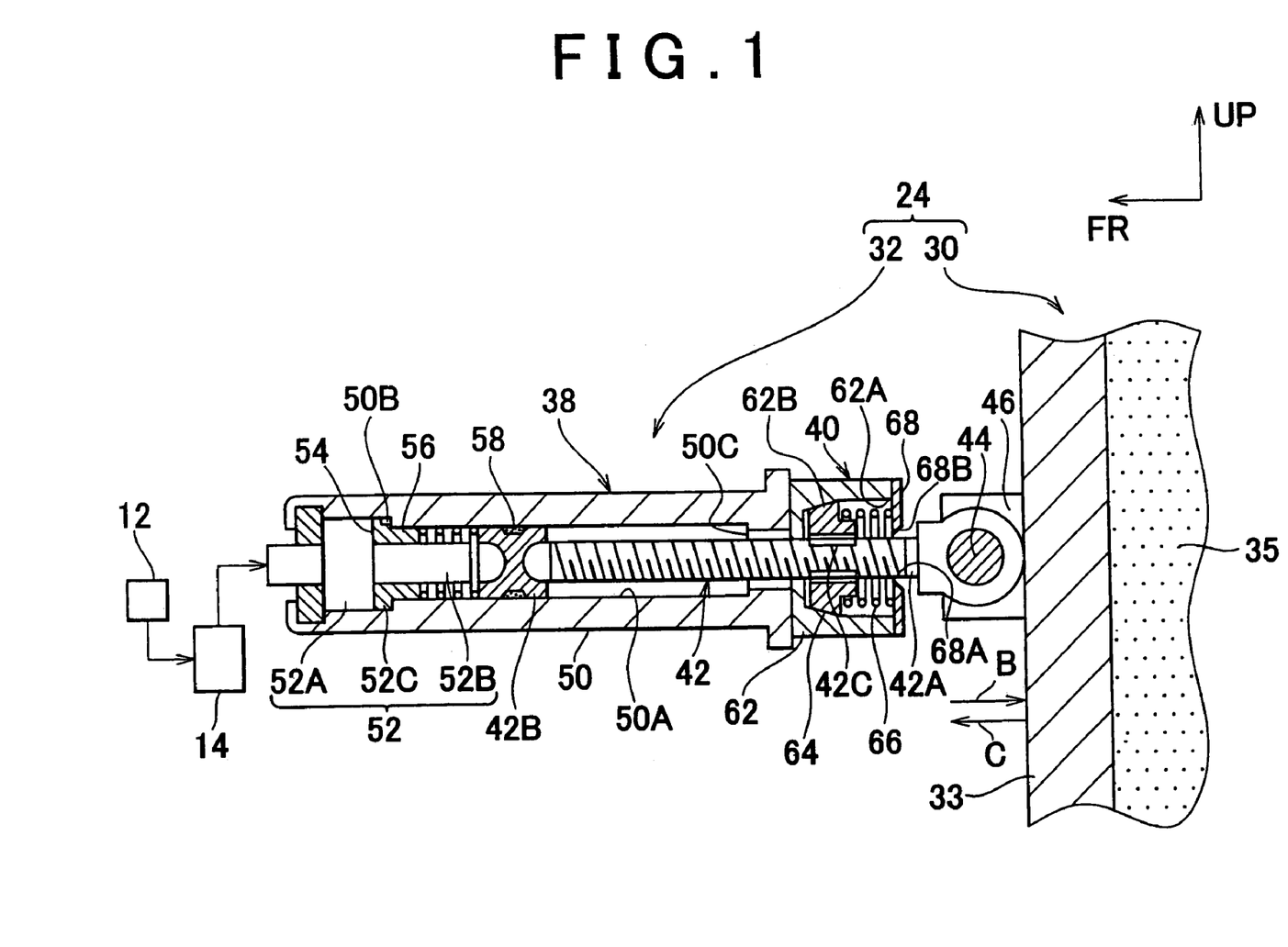
FIG. 1 is a side cross sectional view of, a main portion of an occupant protection apparatus for a vehicle according to a first embodiment of the invention.

As shown in FIG. 1, the actuator 32 of the active knee bolster 24 is provided with a force generation unit 38 and a one way lock mechanism 40, which is disposed in the vicinity of an operation end of the force generation unit 38, as a stopping mechanism. A shaft 44 that is attached to a free end portion (a vehicle body backward direction side end portion) of a piston rod 42A of a piston member 42 of the force generation unit 38 is coupled to a shaft receiving portion 46 formed in the base portion 33 of the main body 30 of the active knee bolster 24.

The force generation unit 38 has a cylinder 50; a piston main body 42B that is accommodated within an inner bore 50A of the cylinder 50 so as to be capable of moving reciprocally; and a gas generation unit 52 that is accommodated further to a base end side (a vehicle body forward direction side) of the inner bore 50A from the piston main body 42B. The gas generation unit 52 is connected to the control circuit 14.

A seal member 54 with elastic properties and a helical compression spring 56 are interposed between the piston main body 42B and the gas generation unit 52 such that the piston main body 42B is normally urged in an operation direction (an outward protrusion direction). Note that it is preferable that the seal member 54 has elasticity in an axial direction, and is capable of effectively inhibiting leakage of gas at times of gas generation.

The gas generation unit 52 has a base end side large diameter portion 52A and a tip end side small diameter portion 52B that ejects gas. A stepped portion 52C therebetween abuts against and engages with a stepped portion 50B formed in the cylinder 50 via a ring shaped sealing member 54 with elastic properties. Further, the gas generation unit 52 is inserted through a central hole of the seal member 54 so as to be inserted within a central hole of the helical compression spring 56. Further, the stepped portion 52C forms a spring seat of the helical compression spring 56 via the seal member 54.

The piston main body 42B abuts with a wall surface of the internal bore 50A via an O-ring 58. Moreover, the piston rod 42A abuts with the piston main body 42B in the axial direction, and a piston is configured from the piston main body 42B and the piston rod 42A. Note that, the piston main body 42B and the piston rod 42A engage (abut with each other) by contact of respective center portions of a concave portion which curves toward an axial center with a determined curvature, for example, a spherical shaped concave portion, and a convex portion forming a curved surface with a curvature slightly smaller than that of the concave portion. Accordingly, the piston main body 42B and the piston rod 42 self-center with respect to each other, whereby twisting, or the like, of the piston rod 42A within the cylinder 50 is inhibit from occurring. Thus, there is no likelihood that energy loss or gas leakage due to eccentricity will take place.

The one way lock mechanism 40 is provided in a tip end portion (a vehicle body backward direction side portion) of the force generation unit 38. This one way lock mechanism 40 is configured from a plurality of engagement portions 64 that surround an external periphery of the piston rod 42A; a spring 66 that urges the engagement portions 64 toward the base side of the piston member 42, namely, toward the cylinder 50 side; and a casing 62 which is disposed so as to surround an external periphery of the piston member 42 and which accommodates the engagement portions 64 and the spring 66.

In addition, an external periphery surface of each of the engagement portions 64 has a radius that gradually reduces toward the base end side from the free end side of the piston member 42, and the inside of the casing 62 is formed from a large diameter portion 62A and a taper portion 62B that gradually tapers inwards from the larger diameter portion 62A.

Figure 2:
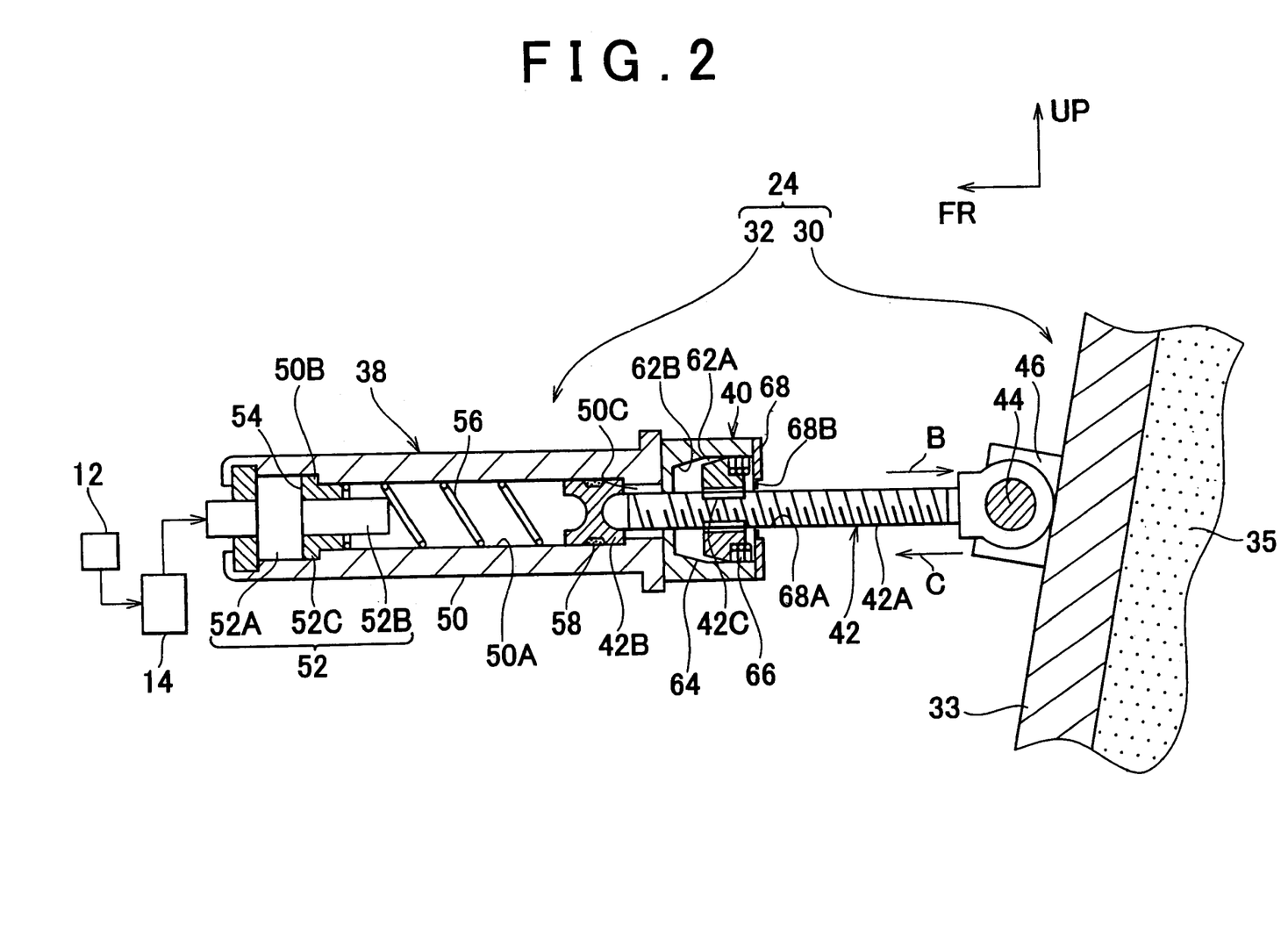
FIG. 2 is a side cross sectional view of an operation state of the occupant protection apparatus for a vehicle according to the first embodiment of the invention.

Accordingly, in the state shown in FIG. 1, each of the engagement portions 64 is urged by the spring 66 so as to be pressed against the taper portion 62B and thus abutted with an external periphery surface of the piston member 42. However, as shown in FIG. 2, when the piston member 42 is moved in the outward protrusion direction (the direction indicated by arrow B in FIG. 2), each of the engagement portions 64 is also moved in the outward protrusion direction of the piston member 42 in resistance to an urging force of the spring 66. When the engagement portions 64 reach the large diameter portion 62A they are separated from the piston member 42, and thus the piston member 42 becomes able to operate freely.

On the other hand, when attempted operation of the piston member 42 in an inward insertion direction (the direction indicated by arrow C in FIG. 2) occurs, each of the engagement portions 64 is moved in resistance to the urging force of the spring 66 so as to abut with the external periphery surface of the piston member 42. Thus, both engagement portions 64 and the piston member 42 become fixed.

At this point, note that a first groove 42C, which may be a threaded groove or a ring-shaped groove, is formed in the external periphery surface of the piston rod 42A. An internal periphery surface of each of the engagement portions 64 is formed with a second groove 42C, which may be a threaded groove or a ring-shaped groove, that corresponds to the first groove 42C. Accordingly, when attempted operation of the piston member 42 in the inward insertion direction occurs, the configuration is such that the internal periphery surface of the engagement elements 64 and the external periphery surface of the piston member 42 are engaged such that the piston member 42 and the engagement elements 64 are firmly fixed in an engaged position.

Moreover, a load regulation unit 68 that forms a lid-like member of the casing 62 is provided at a tip end portion (a vehicle body backward direction side end portion) of the one way lock mechanism 40. An opening 68A is formed at a center portion of the load regulation unit 68. A third groove (not specifically shown), which may be a threaded groove or a ring-shaped groove, that engages with the first groove 42C of the piston rod 42A is formed in an internal peripheral surface of the opening 68A. Further, a thin portion 68B is formed at a periphery of the opening 68A.

As a result, even if attempted operation of the piston member 42 in the outward protrusion direction (the direction indicated by the arrow B in FIG. 1) occurs during non-activated periods, the third groove formed in the opening 68A is engaged with the first groove 42C formed in the external peripheral surface of the piston member 42. Accordingly, the configuration allows the position of the piston member 42 to be maintained without change in a non-activated position. On the other hand, in the case that a substantial load, namely, an outward pushing force of the gas generation unit 52, that is greater than a set load, is applied, the configuration is such that the thin, portion 68B breaks, and the piston member 42 becomes able to move in the outward protrusion direction (the direction indicated by arrow B in FIG. 1).

Further, in this embodiment, as shown in FIG. 4, an air bag 92 for the driver's seat is provided in a steering wheel 90, and another air bag 92 is provided for the passenger seat in an upper portion 18B of the instrument panel 18. Inflators that operate the air bags 92 are respectively connected to the control circuit 14. Note that, as shown in FIG. 4, a seat belt 94 is provided for the front seat 20.

Next, the operation of this embodiment will be explained.

During normal running, the internal periphery surface of the opening 68B of the load regulation unit 68, which is provided in the one way lock mechanism 40 of the actuator 32 of the active knee bolster 24, and the first groove 42C of the external periphery surface of the piston member 42 are engaged. Accordingly, the piston member 42, and the main body 30 of the active knee bolster 24 coupled thereto, are maintained in the non-activated position without being inadvertently operated.

On the other hand, if the vehicle has a collision, first, the control circuit 14, determines whether deceleration is equal to or more than a predetermined value, based on an input signal from the acceleration sensors 12. If deceleration is determined to be equal to or more than the determined value, the control circuit 14 operates the actuator 32 of the active knee bolster 24.

In other words, gas is generated by the gas generation unit 52 of the actuator 32, and the outward pushing force that pushes in the outward protrusion direction (the direction indicated by arrow B in FIG. 1) of the piston member 42 is generated as a result of pressure within the cylinder 50 rising rapidly. Accordingly, a load equivalent to the outward pushing force is applied to the free end side of the piston member 42, namely, is applied to the opening portion 68A of the load regulation unit 68 that is engaged with the first groove 42C of the free end side of the piston rod 42A. Thus, the thin portion 68B is broken, and the free end side of the piston member 42 is instantaneously caused to protrude out from the cylinder 50.

At this time, as shown in FIG. 2, in the one way lock mechanism 40, when the piston member 42 moves in the outward protrusion direction (the direction indicated by arrow B in FIG. 2), the engagement portions 64 also move in the outward protrusion direction of the piston member 42 in resistance to the spring 66. When the engagement portions 64 reach the large diameter portion 62A they are separated from the piston member 42, and thus the piston member 42 becomes able to operate freely.

As a result, the main body 30 of the active knee bolster 24, which is connected to the free end portion of the piston rod 42A via that shaft 44, is rotationally moved around the connecting shaft 34 which is disposed along the vehicle width direction at the lower portion of the base portion 33 and which connects with the vehicle body side. At this time, the main body 30 is rotationally moved in the direction of the lower limbs 28A of the occupant 28 (the direction indicated by arrow A in FIG. 4) from the stored position indicated by the solid line shown in FIG. 4 to the lower limb restraining position that restrains the lower limbs 28A of the occupant 28.

Following this, in the lower limb restraining position, if the lower limbs 28A of the occupant 28 move in a manner that causes attempted operation of the piston member 42 in the inward insertion direction (the direction indicated by arrow C in FIG. 2), in the one way lock mechanism 40, the engagement portions 64 are moved to the taper portion 62B so as to abut with the external periphery surface of the piston member 42. Accordingly, both the engagement portions 64 and the piston member 42 are fixed.

As a result, the main body 30 of the active knee bolster 24 which has been moved to the restraining position is not able to return in the vehicle forward direction, and a substantial lower limb restraining force is generated that restrains the lower limbs 28A of the occupant 28.

In other words, in this embodiment, as a result of the one way lock mechanism 40, the substantial lower limb restraining force is generated that restrains the lower limbs 28A of the occupant 28. Accordingly, it is possible to reduce the movement force at which the main body 30 of the active knee bolster 24 is moved in the direction of the lower limbs 28A of the occupant. In other words, it is possible to reduce the outward pushing force generated by the gas generation unit 52.

Accordingly, in this embodiment, it is possible to reduce the outward pushing force generated by the gas generation unit 52 so as to take into consideration the case when the lower limbs of an occupant of large build come into contact with the main body 30 of the active knee bolster 24. Therefore, according to this embodiment, regardless of the lower-limb-build of the occupant 28, it is possible to simultaneously protect the lower limbs of the occupant 28 and provide effective lower limb restraining performance.

Hereinabove, a detailed explanation has been presented concerning a specific embodiment of the invention. However, the invention is not limited to the above described embodiment, and as will be clearly apparent to those skilled in the art, the scope of the invention permits of various other embodiments. For example, in the above embodiment, the one way lock mechanism 40 that functions as a stopping mechanism is configured to be the same for both left and right sides with equal resistance to load from the occupant 28. However, so long as it is possible to ensure sufficient strength, it is only necessary to provide the stopping mechanism in one of left and right sides.

Figure 5:
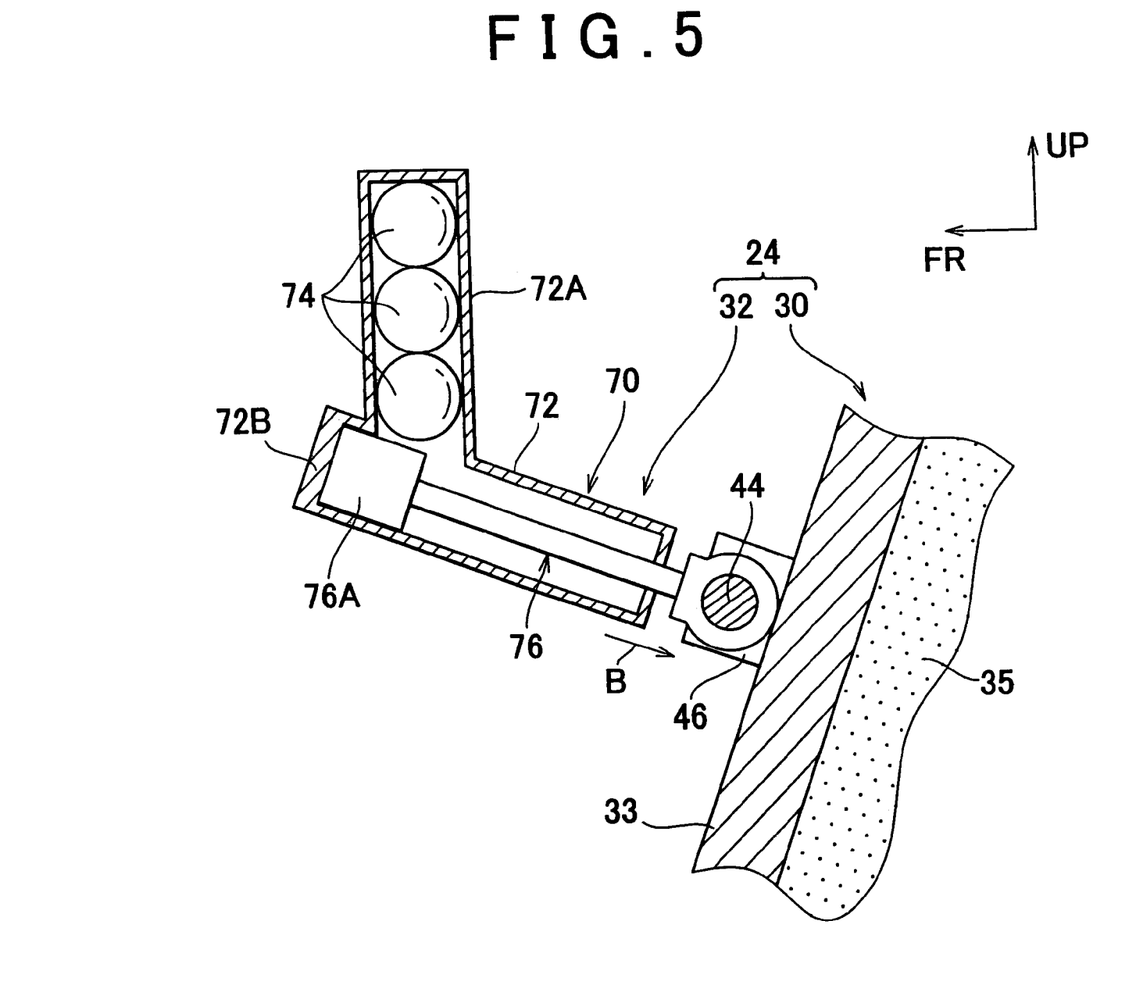
FIG. 5 is a side cross sectional view of a main portion of an occupant protection apparatus for a vehicle according to an other embodiment of the invention.
Figure 6:
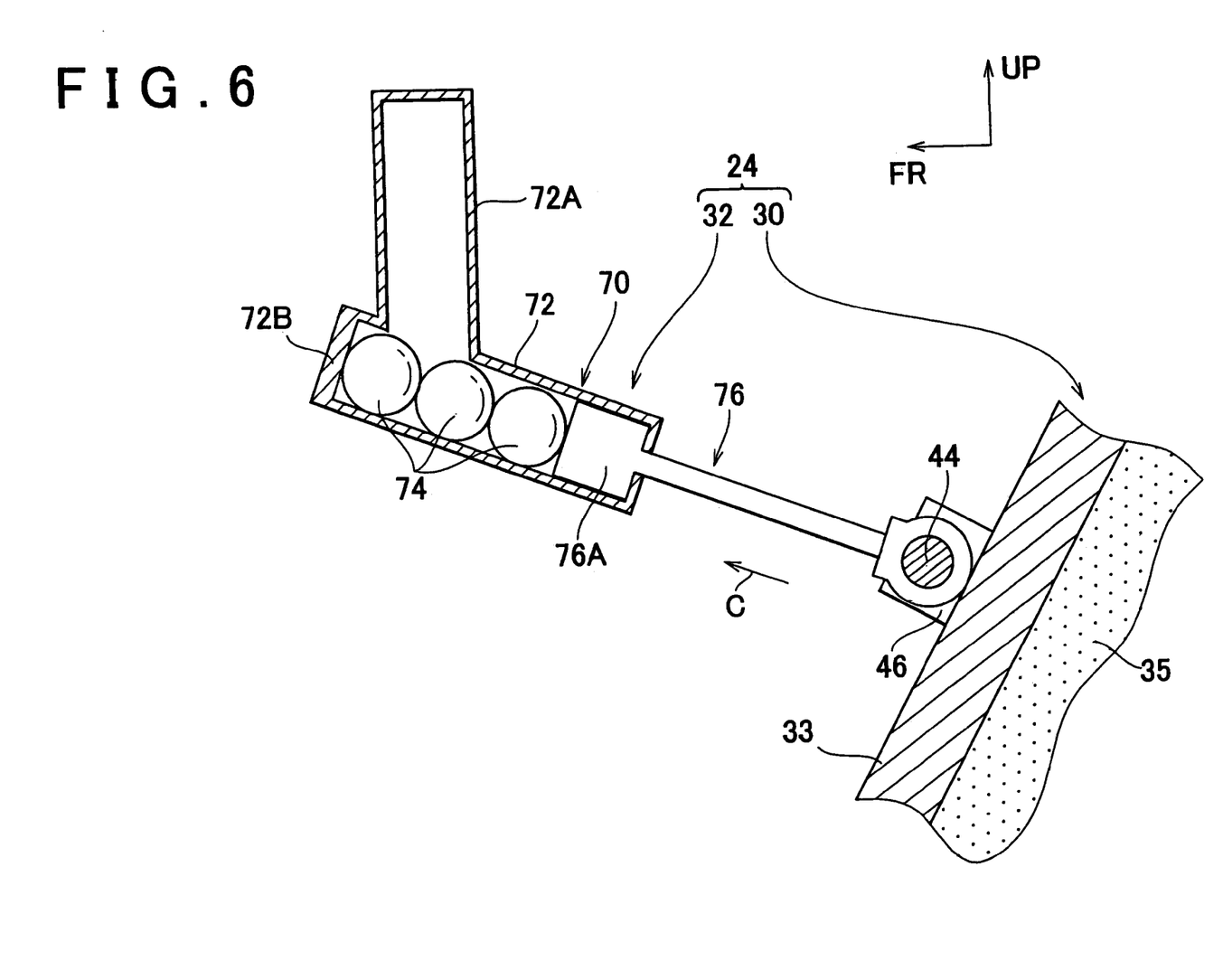
FIG. 6 is a side cross sectional view of an operation state of the occupant protection apparatus for a vehicle according to the other embodiment of the invention.

Further, a configuration may be adopted in which the respective left and right main bodies 30 of the active knee bolsters 24 are inter-coupled. As a result, the force generation unit 38 may be provided in one of the left and right active knee bolsters 24, and, as shown in FIGS. 5 and 6, a ball one way lock mechanism 70 that acts as a stopping mechanism capable of locking at predetermined variable position may be provided. Note that, as shown in FIG. 5, the ball one way lock mechanism 70 is configured such that when a piston main body 76A of a piston member 76 moves, a plurality of balls 74 provided within a branch portion 72A of a cylinder 72 move so as to be positioned between the piston main body 76A and the end portion 72B of the cylinder 72 as shown in FIG. 6. Thus, as a result of inhibiting movement of the piston main body 76A, the main body 30 of the active knee bolster 24 that has moved to the lower limb restraining position cannot return in the vehicle forward direction, and a substantial lower limb restraining force is generated.

Moreover, a configuration may be adopted in which the force generation unit 38 and the ball one way lock mechanism 70 are adopted in both the left and right active knee bolsters 24.

Further, it is possible to adopt different types of stopping mechanism for the left and the right active knee bolsters 24, respectively.

In addition, if the force generation unit 38 is provided in the both the left and right actuators 32, the respective force generation units 38 may be miniaturized. This offers the advantage that there is no need for one of the force generation units 38 to be made large. However, so long as it is possible to obtain enough force, the force generation device 38 need only be provided in one of the left and right actuators.

Moreover, in the above described embodiments, the occupant protection apparatus for a vehicle according to the invention is applied as an occupant protection apparatus for a vehicle for the driver's seat. However, it is possible to apply the occupant protection apparatus for a vehicle according to the invention to other occupant protection apparatuses for vehicles, such as one for the passenger's seat.

With the occupant protection apparatus for a vehicle of the above described first embodiment, the projecting force of the active knee bolster 24 in the occupant lower limb direction is made smaller as compared to the occupant lower limb restraining force. Accordingly, the above embodiments offers the highly advantageous benefit that is it simultaneously possible to protect the occupant's lower limbs and provide effective lower limb restraining performance, regardless of the build of the occupant.

According to the above described embodiments, the occupant protection apparatus for a vehicle has the stopping mechanism that maintains a lower limb restraining device in a lower limb restraining position. Accordingly, in addition to the above described benefit, the embodiment has the further highly advantageous benefit that it is possible to further raise the lower limb restraining performance.

What is claimed is:

1. An occupant protection apparatus for a vehicle, comprising:
a deceleration detection device that detects a vehicle deceleration;
a lower limb restraining member that restrains at least one of left and right lower limbs of an occupant by being moved in an occupant lower limb direction;
a driving device that drives the lower limb restraining member in the occupant lower limb direction;
a control device that controls activation of the driving device when a signal of the deceleration detection device is received; and
a stopping mechanism that holds the lower limb restraining member such that movement in a reverse direction that is opposite to a movement direction of the lower limb restraining member is limited so that the at least one lower limb is restrained, the stopping mechanism being a one way lock mechanism, and the movement direction being generated by the driving device, wherein a force at which the lower limb restraining member is moved in the occupant lower limb direction by the driving device is smaller than a force at which the stopping mechanism restrains the at least one lower limb of the occupant.

2. The occupant protection apparatus for a vehicle according to claim 1, wherein the lower limb restraining member has left and right main body sections that respectively hold the left and right lower limbs of the occupant.

3. The occupant protection apparatus according to claim 1, wherein the one way lock mechanism has a ball one way lock mechanism that is configured such that return of the lower limb restraining device to an original position from which the lower limb restraining device has moved is inhibited by movement into a space that remains following the movement of the lower limb restraining device of at least one ball in accordance with the size of the space.

4. The occupant protection apparatus for a vehicle according to claim 1 wherein the lower limb restraining member includes a main body portion that can be abutted with the at least one lower limb, and a piston member that is provided for pushing the main body portion outwards, the one way lock mechanism is disposed within a casing that is provided in an end portion at a vehicle backward direction side of the driving device, and the driving device has a slip-out inhibiting member which closes off the vehicle backward direction side of the casing, and which inhibits slip-out of piston member.

5. The occupant protection apparatus for a vehicle according to claim 4 wherein the slip-out inhibiting member is provided at the end of the casing which faces towards the rear of the vehicle, and has a load regulation member, the load regulating member being configured such that, when a driving force of the driving device is generated and a load, that is equal to or greater than a predetermined load is applied to the slip-out inhibiting member, the piston member is released such that movement of the lower limb restraining device is permitted.

6. The occupant protection apparatus for a vehicle according to claim 1, wherein the lower limb restraining member comprises a shock absorbing member provided on an occupant side surface of the lower limb restraining member and, when the lower limb of the occupant impacts the lower limb restraining member, the shock absorbing member absorbs more of the impact energy than the one-way lock mechanism.

* * * * *